(12) United States Patent
Oh et al.

(10) Patent No.: US 8,232,698 B2
(45) Date of Patent: Jul. 31, 2012

(54) STEP MOTOR

(75) Inventors: Seong-Kwan Oh, Incheon (KR); Hyun-Ki Yang, Incheon (KR); Ki-Hwan Hong, Bucheon (KR); Hyuk-Sang Ahn, Incheon (KR)

(73) Assignee: Moatech Co., Ltd (KR)

( * ) Notice: Subject to any disclaimer, the term of this patent is extended or adjusted under 35 U.S.C. 154(b) by 222 days.

(21) Appl. No.: 12/820,067

(22) Filed: Jun. 21, 2010

(65) Prior Publication Data

US 2011/0001378 A1    Jan. 6, 2011

(30) Foreign Application Priority Data

Jul. 3, 2009  (KR) .................. 10-2009-0060480

(51) Int. Cl.
*H02K 5/16*    (2006.01)
(52) U.S. Cl. ............................. 310/90; 310/89
(58) Field of Classification Search .............. 310/89–90, 310/49.01–49.55
See application file for complete search history.

(56) References Cited

U.S. PATENT DOCUMENTS

| | | | | |
|---|---|---|---|---|
| 3,704,922 A | * | 12/1972 | Kleinschmidt et al. | 384/582 |
| 4,128,778 A | * | 12/1978 | Merkle et al. | 310/67 R |
| 5,229,676 A | * | 7/1993 | Bood | 310/114 |
| 5,945,759 A | * | 8/1999 | Tanaka et al. | 310/90 |
| 6,879,071 B2 | * | 4/2005 | Kanazawa et al. | 310/71 |
| 7,348,698 B2 | * | 3/2008 | Ohta et al. | 310/80 |
| 7,649,290 B2 | * | 1/2010 | Michioka et al. | 310/90 |
| 7,679,251 B2 | * | 3/2010 | Ohkawa et al. | 310/156.12 |
| 2008/0084125 A1 | * | 4/2008 | Ohkawa et al. | 310/43 |

* cited by examiner

*Primary Examiner* — Thanh Lam
(74) *Attorney, Agent, or Firm* — John K. Park; Park Law Firm

(57) ABSTRACT

Disclosed herein is a PM type step motor used to move a camera or an optical pickup lens of media related equipment. In the step motor, coupling holes are formed in the central portions of both sides of a casing unit thereof, a bushing is press-fitted or inserted into an associated coupling hole, and a ring member is press-fitted over the outer circumference of the bushing protruding outward from the coupling hole such that the bushing is secured to the casing unit, thus preventing the bushing from becoming separated from the casing unit. The step motor can be freely applied to peripheral device modules of various outer diameters using the ring member.

12 Claims, 2 Drawing Sheets

STEP MOTOR

BACKGROUND OF THE INVENTION

1. Field of the Invention

The present invention relates generally to a PM (permanent magnet) type step motor used to move a camera or an optical pickup lens of media related equipment and, more particularly, to a step motor wherein coupling holes are formed in the central portions of both sides of a casing unit thereof, a bushing is press-fitted or inserted into an associated coupling hole, and a ring member is press-fitted over the outer circumference of the bushing protruding outward from the coupling hole such that the bushing is secured to the casing unit, thus preventing the bushing from becoming separated from the casing unit, and such a step motor can be freely applied to peripheral device modules of various outer diameters using the ring member.

2. Description of the Related Art

Generally, a PM (permanent magnet) type step motor includes a rotor to which magnets are attached, and a stator which is spaced apart from the outer circumferences of the magnets by a predetermined interval, so that the step motor rotates in response to an external electric signal applied to the stator.

The step motor includes the rotor and the stator, with a casing provided around the outer circumference of the stator to protect and cover the stator.

The rotor includes a plurality of magnets which are provided on the outer circumference of a rotating shaft and are magnetized such that their N and S poles alternate, the rotor being inserted into the inside of the stator. The stator includes a bobbin which receives the coil and yokes which have a plurality of yoke teeth inserted into the inside of the bobbin.

The yokes are constructed such that the plurality of yoke teeth face and engage with each other. The magnetic path of the magnets is formed to pass through the yoke teeth which engage with each other, so that the rotor of the step motor is rotated by external power applied to the stator.

The step motor includes one pair of bobbins which are coupled to face each other. A terminal block protrudes from the upper portion of each bobbin, and protects a connection terminal pin which applies external power to the coil received in the bobbin.

In the conventional PM type step motor, two pairs of yoke teeth which face each other protrude axially. A bushing for supporting the shaft is press-fitted into each of the opposite ends of the casing which surrounds and protects the yoke teeth, or the bushing is secured using a cover having a hollow portion and then is attached to the casing.

Here, the cover and the casing do not reliably support the bushing, so that the bushing may become separated. In order to solve the problem, the bushing is secured by caulking or a similar process. However, the caulking process may crush the bushing, so that the bushing may be distorted. Further, the bushing may be deformed by the caulking and press-fitting. It is difficult to concentrically arrange the bushings provided on the opposite ends of the stator and the stator.

Further, the outer diameter of the bushing protruding from the casing may be used as a matching reference when the step motor is used in a camera or a media related equipment module. However, in order to make it the required size, the construction of the casing must be changed. In this case, constraints are imposed on the method of locking the bushing.

SUMMARY OF THE INVENTION

Accordingly, the present invention has been made keeping in mind the above problems occurring in the prior art, and an object of the present invention is to provide a step motor, wherein coupling holes are formed in the central portions of both sides of a casing unit thereof, a bushing is press-fitted or inserted into an associated coupling hole, and a ring member is press-fitted over the outer circumference of the bushing protruding outward from the coupling hole such that the bushing is secured to the casing unit, thus preventing the bushing from becoming separated from the casing unit, and which can be simply matched with a peripheral device module of the step motor merely by adjusting the outer diameter of the ring member fitted over a portion protruding outward from the casing unit, so that such a step motor can be freely applied to peripheral device modules of various outer diameters using the ring member.

In order to accomplish the above object, the present invention provides a step motor having a stator unit which includes a bobbin receiving a coil that generates a magnetic force when external power is applied thereto, and a yoke attached to the bobbin, and having a rotor unit which is inserted into an inside of the stator and includes a magnet mounted to an outer circumference of a rotating shaft, thus generating a rotating force, and having a casing unit which is provided around an outer circumference of the stator unit to protect and cover the stator unit, wherein a coupling hole is formed in a central portion of each of opposite side surfaces of the casing unit, so that a bushing supporting the rotor unit is press-fitted into the coupling hole, and a ring member is press-fitted over an outer circumference of a portion of the bushing which protrudes out of the casing unit, so that the bushing is secured to the casing unit.

The ring member may be provided on only one of the opposite side surfaces of the casing unit and may be press-fitted over the outer circumference of the portion of the bushing which protrudes out of the casing unit, so that the bushing is secured to the casing unit.

Further, ring members, provided on the opposite sides of the casing unit in such a way as to be press-fitted over the outer circumference of the bushing, may have the same outer diameter.

Further, ring members, provided on the opposite sides of the casing unit in such a way as to be press-fitted over the outer circumference of the bushing, may have different outer diameters.

The bushing may include in a central portion thereof a through hole and be a two-stage structure having on an outer circumference thereof a small outer diameter part and a large outer diameter part, the large outer diameter part being inserted into the stator unit, the small outer diameter part being inserted into the coupling hole formed in the central portion of each of opposite side surfaces of the casing unit, the rotating shaft passing through the through hole.

Further, an outer diameter of the large outer diameter part of the bushing may be the same as a diameter of the inner circumference of the stator unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a step motor according to the present invention will be described in detail with reference to the accompanying drawings.

Figure 1:
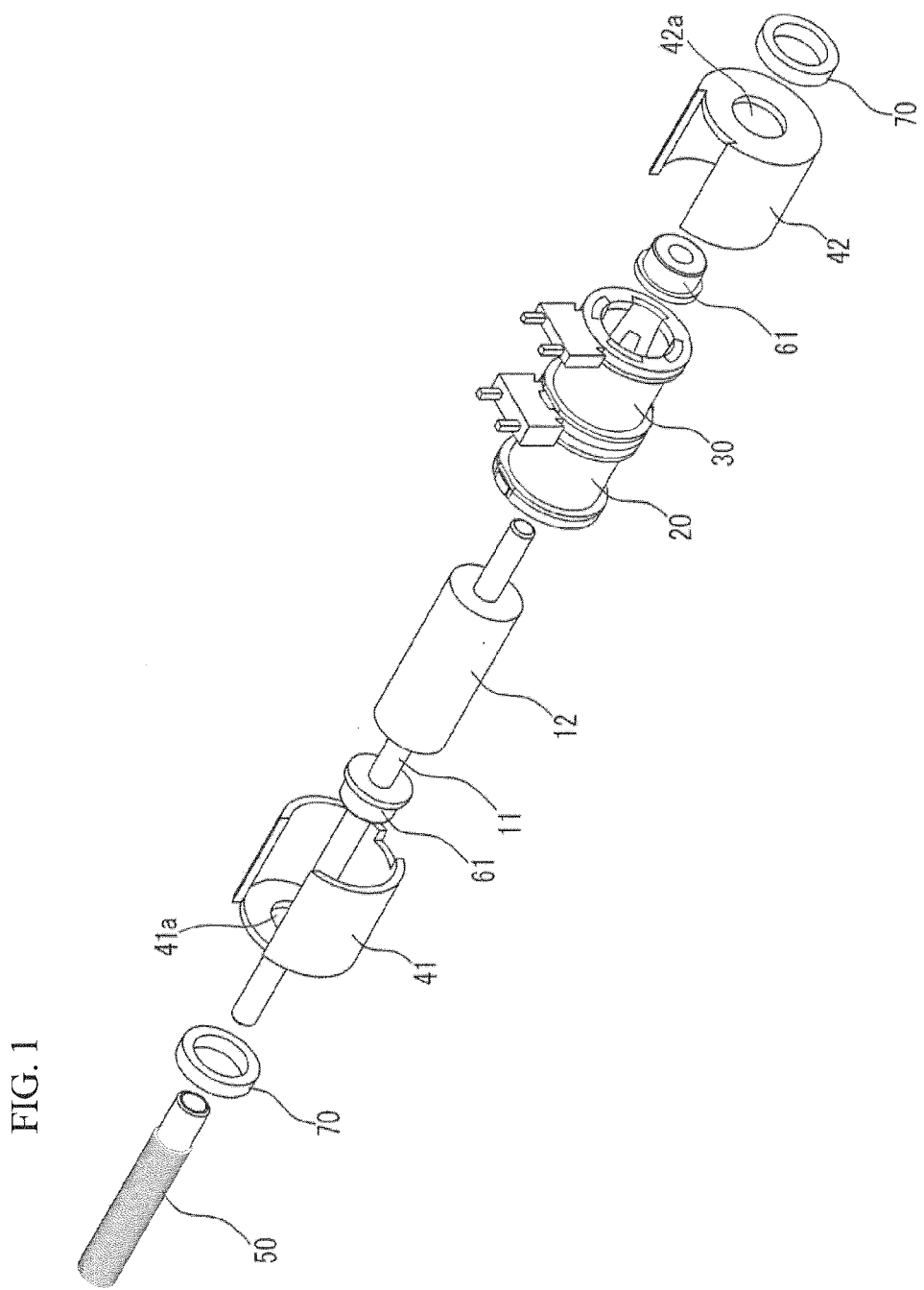
FIG. 1 is an exploded perspective view illustrating an entire step motor according to the present invention.
Figure 2:
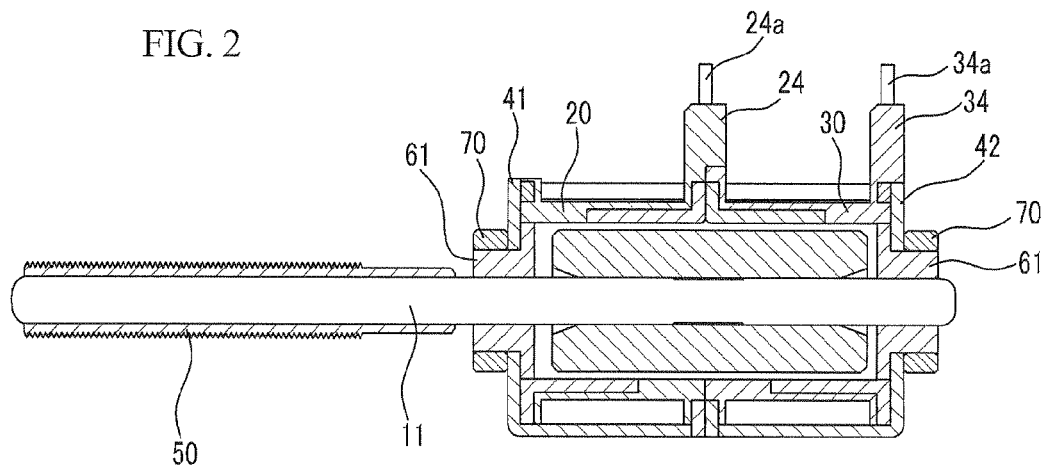
FIG. 2 is a sectional view illustrating the step motor according to the present invention.
Figure 3:
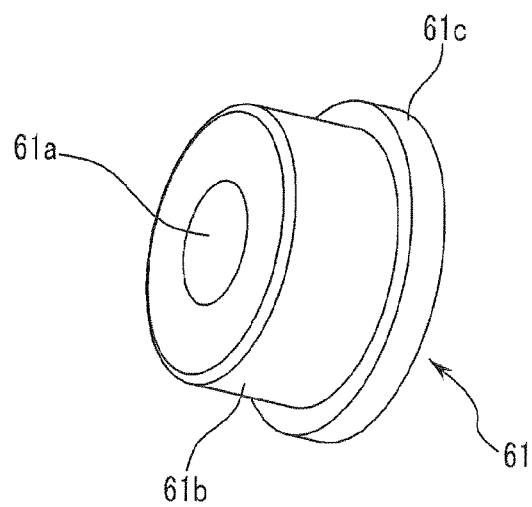
FIG. 3 is a detail view illustrating the structure of a bushing of the step motor according to the present invention.

FIG. 1 is an exploded perspective view illustrating an entire step motor according to the present invention, FIG. 2 is a sectional view illustrating the step motor according to the present invention, and FIG. 3 is a detail view illustrating the structure of a bushing of the step motor according to the present invention.

As shown in FIGS. 1 to 3, the step motor according to the present invention includes a stator unit, a rotor unit, casings 41 and 42, and a lead screw 50. The stator unit includes first and second stators 20 and 30 which butt against and are coupled to each other. Each of the first and second stators 20 and 30 includes a bobbin receiving a coil (not shown) which generates a magnetic force when external power is applied thereto, and a yoke attached to the bobbin, with a plurality of yoke teeth formed on the yoke. The rotor unit is inserted into the inside of the stator, and has a plurality of magnets 12 having N and S poles which are alternately provided on the outer circumference of a rotating shaft 11, thus generating a rotating force. The casings 41 and 42 are provided on the outer circumference of the stators 20 and 30 to protect and cover the stators 20 and 30. The lead screw 50 is coupled to an end of the rotating shaft, and transmits a rotating force of the rotating shaft.

Each of the first and second stators 20 and 30 may be manufactured by insert molding such that the bobbin, the yoke coupled to the bobbin and having the plurality of yoke teeth, a terminal block 24 or 34 protruding vertically from an end of the bobbin, and a terminal pin 24a or 34a formed on the terminal block 24 or 34 are integrated with each other.

The first and second stators 20 and 30 manufactured using insert molding may be assembled with each other in such a way as to butt against each other, thus providing one stator unit. Alternatively, the first and second stators 20 and 30 may be integrally insert molded, thus providing one stator unit.

When viewing the stator unit in a direction perpendicular to the rotating shaft 11, the terminal blocks 24 and 34 provided on the upper ends of the first and second stators 20 and 30 are spaced apart from each other by a predetermined interval corresponding to the length of the bobbin and are arranged to be parallel to each other. When viewed along the direction of the rotating shaft 11, the terminal blocks 24 and 34 overlap. As such, the terminal blocks 24 and 34 are spaced apart from each other by a predetermined interval, thus acquiring a minimum terminal interval, which makes it easy to perform an automatic winding operation using winding equipment.

Meanwhile, a casing unit which is provided on the outer circumference of the stator unit to protect and cover the stator unit comprises two casings, that is, the first and second casings 41 and 42. Each of the first and second casings 41 and 42 has a closed first side surface and an open second side surface. A coupling hole 41a or 42a having a predetermined diameter is formed in the central portion of the first surface of the first or second casing 41 or 42. Here, the first and second casings 41 and 42 are coupled to face each other. The outer circumference of the casing 41 or 42 is cut to the width of the terminal block 24 or 34. The cut length extends from the terminal block 24 or 34 to the first surface of the casing 41 or 42.

Further, the terminal block 24 or 34 is shaped such that its upper portion is wide and its lower portion is narrow when viewed along the direction of the rotating shaft 11. The casing 41 or 42 is coupled to the narrow lower portion. Such a construction allows the casing 41 or 42 to be slidably coupled to the narrow portion of the terminal block 24 or 34. When the casing 41 or 42 has been coupled to the terminal block 24 or 34, the terminal block 24 or 34 may overlap with part of the casing 41 or 42 so that the casing 41 or 42 may be more firmly coupled.

Meanwhile, the bushing 61 is inserted into the coupling hole 41a or 42a of each casing 41 or 42. As shown in FIG. 3, the bushing 61 has at its central portion a through hole 61a through which the rotating shaft 11 passes, and has a two-stage structure which includes a small outer diameter part 61b and a large outer diameter part 61c on the outer circumference of the bushing 61. Preferably, the outer diameter of the small outer diameter part 61b is equal to or slightly smaller than the diameter of the coupling hole 41a or 42a of the casing 41 or 42, and the outer diameter of the large outer diameter part 61c is the same as the diameter of the inner circumference of the stator 20 or 30.

The large outer diameter part 61c of the bushing 61 is press-fitted or inserted into the stator 20 or 30, and the small outer diameter part 61b is press-fitted or inserted into the coupling hole 41a or 42b formed in the central portion of the first side surface of the casing 41 or 42. The rotating shaft 11 passes through the through hole 61a, so that the rotating shaft 11 is supported by the bushing 61.

Further, when the small outer diameter part 61b of the bushing 61 is press-fitted or inserted into the coupling hole 41a or 42b formed in the central portion of the first surface of each casing 41 or 42, a portion of the small outer diameter part 61b of the bushing 61 is made to protrude out of the casing 41 or 42. A ring member 70 is press-fitted over the outer circumference of this portion of the small outer diameter part 61b of the bushing 61 which is protruding out of the casing 41 or 42, so that the bushing 61 can be more firmly secured to the casing 41 or 42.

The ring member 70 which is press-fitted over the outer circumference of this portion of the small outer diameter part 61b of the bushing 61 that is protruding out of the casing 41 or 42 may be mounted to only one side surface of either of the casings 41 and 42, or may be mounted to side surfaces of both the casings 41 and 42 so as to secure the bushing 61 to each casing 41 or 42.

When ring members 70 are provided on the side surfaces of both the casings 41 and 42 in such a way as to be press-fitted over the outer circumferences of respective bushings 61, the ring members 70 have the same or different outer diameters.

The outer diameter of the ring member 70 is used as a matching reference when the step motor is coupled to peripheral devices of the step motor, for example, a camera module or a media related equipment module. By merely adjusting the outer diameter of the ring member 70, the step motor may satisfy various outer diameters required when the step motor is applied to the peripheral device module.

As described above, the present invention provides a step motor, wherein coupling holes are formed in the central portions of both sides of a casing unit thereof, a bushing is press-fitted or inserted into an associated coupling hole, and a ring member is press-fitted over the outer circumference of the bushing protruding outward from the coupling hole such that the bushing is secured to the casing unit, thus allowing the bushing to be stably secured to the casing, therefore eliminating noise generated by the shaking of the bushing even when friction is created between the bushing and a rotating shaft.

Further, the present invention provides a step motor, which can be freely applied to peripheral device modules of various outer diameters merely by adjusting the outer diameter of a ring member press-fitted over the outer circumference of a bushing.

Further, the present invention provides a step motor, wherein a bushing which includes in a central portion thereof a through hole and is a two-stage structure having a small outer diameter part and a large outer diameter part is used, so that the large outer diameter part is inserted into the stator unit, the small outer diameter part is inserted into a coupling hole formed in the central portion of a side surface of a casing unit, and a rotating shaft passes through the through hole to be supported, thus allowing the stator unit, the rotating shaft and the casing unit to easily be coaxially arranged.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A step motor having a stator unit which includes a bobbin receiving a coil that generates a magnetic force when external power is applied thereto, and a yoke attached to the bobbin, and having a rotor unit which is inserted into an inside of the stator and includes a magnet mounted to an outer circumference of a rotating shaft, thus generating a rotating force, and having a casing unit which is provided around an outer circumference of the stator unit to protect and cover the stator unit,
   wherein a coupling hole is formed in a central portion of each of opposite side surfaces of the casing unit, so that a bushing supporting the rotor unit is press-fitted or inserted into the coupling hole, and a ring member is press-fitted over an outer circumference of a portion of the bushing which protrudes out of the casing unit, so that the bushing is secured to the casing unit.

2. The step motor as set forth in claim 1, wherein the ring member is provided on only one of the opposite side surfaces of the casing unit and is press-fitted over the outer circumference of the portion of the bushing which protrudes out of the casing unit, so that the bushing is secured to the casing unit.

3. The step motor as set forth in claim 2, wherein the bushing comprises in a central portion thereof a through hole and is a two-stage structure having on an outer circumference thereof a small outer diameter part and a large outer diameter part, the large outer diameter part being press-fitted or inserted into the stator unit, the small outer diameter part being press-fitted or inserted into the coupling hole formed in the central portion of each of opposite side surfaces of the casing unit, the rotating shaft passing through the through hole.

4. The step motor as set forth in claim 3, wherein an outer diameter of the large outer diameter part of the bushing is the same as a diameter of the inner circumference of the stator unit.

5. The step motor as set forth in claim 1, wherein ring members, provided on the opposite sides of the casing unit in such a way as to be press-fitted over the outer circumference of the bushing, have the same outer diameter.

6. The step motor as set forth in claim 5, wherein the bushing comprises in a central portion thereof a through hole and is a two-stage structure having on an outer circumference thereof a small outer diameter part and a large outer diameter part, the large outer diameter part being press-fitted or inserted into the stator unit, the small outer diameter part being press-fitted or inserted into the coupling hole formed in the central portion of each of opposite side surfaces of the casing unit, the rotating shaft passing through the through hole.

7. The step motor as set forth in claim 6, wherein an outer diameter of the large outer diameter part of the bushing is the same as a diameter of the inner circumference of the stator unit.

8. The step motor as set forth in claim 1, wherein ring members, provided on the opposite sides of the casing unit in such a way as to be press-fitted over the outer circumference of the bushing, have different outer diameters.

9. The step motor as set forth in claim 8, wherein the bushing comprises in a central portion thereof a through hole and is a two-stage structure having on an outer circumference thereof a small outer diameter part and a large outer diameter part, the large outer diameter part being press-fitted or inserted into the stator unit, the small outer diameter part being press-fitted or inserted into the coupling hole formed in the central portion of each of opposite side surfaces of the casing unit, the rotating shaft passing through the through hole.

10. The step motor as set forth in claim 9, wherein an outer diameter of the large outer diameter part of the bushing is the same as a diameter of the inner circumference of the stator unit.

11. The step motor as set forth in claim 1, wherein the bushing comprises in a central portion thereof a through hole and is a two-stage structure having on an outer circumference thereof a small outer diameter part and a large outer diameter part, the large outer diameter part being press-fitted or inserted into the stator unit, the small outer diameter part being press-fitted or inserted into the coupling hole formed in the central portion of each of opposite side surfaces of the casing unit, the rotating shaft passing through the through hole.

12. The step motor as set forth in claim 11, wherein an outer diameter of the large outer diameter part of the bushing is the same as a diameter of the inner circumference of the stator unit.

* * * * *